S. H. Gilman,

Ageing Liquors.

No. 102,806. Patented May 10, 1870.

Witnesses

Inventor
Sam'l H. Gilman

United States Patent Office.

SAMUEL H. GILMAN, OF GALVESTON, TEXAS.

Letters Patent No. 102,806, dated May 10, 1870.

IMPROVEMENT IN REFINING AND AGEING LIQUORS.

The Schedule referred to in these Letters Patent and making part of the same.

*To all whom it may concern:*

Be it known that I, SAMUEL H. GILMAN, of Galveston, in the county of Galveston and State of Texas, have invented a new and improved Method of Refining and Ageing Distilled Liquors; and I do hereby declare that the following is a full, clear, and exact description of the same, reference being had to the accompanying drawings making part of this specification, in which—

Similar letters of reference indicate corresponding parts in the two figures.

The object of this invention is to complete the fermentation of the saccharine principle that passes over unfermented, more or less, in all distillation; also to crystallize and precipitate the fusil-oil; also to carbonize and precipitate the herbaceous matter; and also to absorb and precipitate the acids, all of which exist to some extent in all newly distilled spirits.

My invention accomplishes all of these purposes by heating the spirits to a temperature above their own boiling-point under a pressure, in an air-tight vessel, immersed in a water-bath, by which the spirits are heated, and then cooled gradually down by the atmospheric temperature, or to about 90°, before the vessel is opened.

The most perfect uniformity in heating and cooling the entire body of spirits under treatment being indispensable, I obtain that result by immersing the vessel C containing them in a water-bath, and then by filling the vessel with vertical diaphragms $c$, of thin sheet copper, one in about every inch of its diameter; and these diaphragms $c$ are all attached to the sides and bottom of the vessel with solder, in order that the temperature of the sides of the vessel may be conducted at once to the central parts of the body of the spirit, which are in this manner heated uniformly with the outside, which cannot be done in a plain vessel where the liquid is heated next to the sides of the vessel first, and forced up into the cooler portion which takes its place; hence it is important, in order to accomplish one of the objects of my invention, that the liquor, while being heated, should have as little circulation as possible, as will appear hereinafter.

Figure 1:
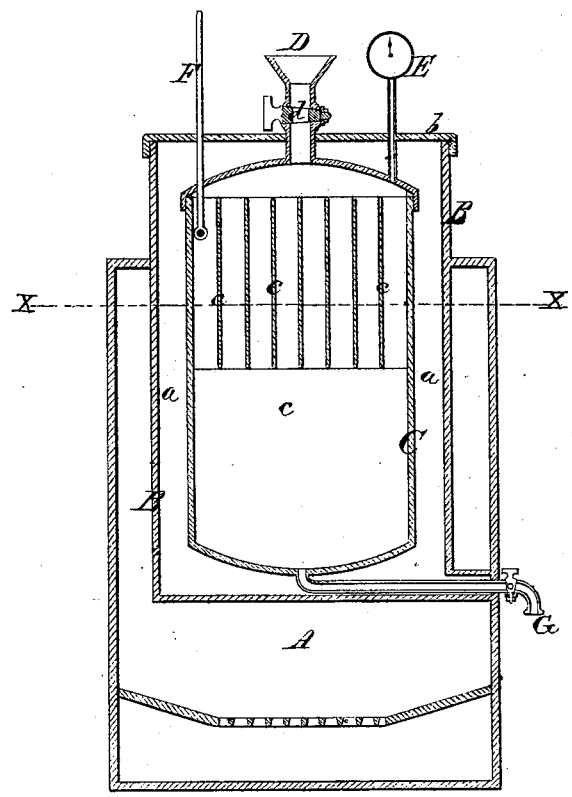
Figure 1 is a vertical central section through an apparatus which I employ in conducting the process.
Figure 2:
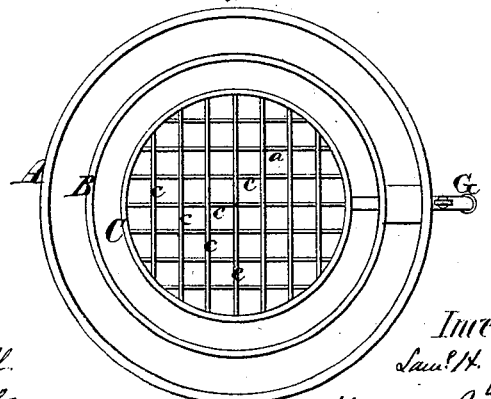
Figure 2 is a section through fig. 1, taken in the horizontal plane indicated by dotted line $x\ x$.

The heat-conducting power of the copper diaphragms keeps them at the same temperature nearly as that of the sides of the vessel to which they are attached; and to insure a perfect mixture during any circulation that may occur in heating the spirits, I arrange the diaphragms horizontally, at about the center of their height, into two sections, as shown in fig. 1, and turn the upper and lower sections at right angles, so that the ascending current from each space between the diaphragms of the lower section will enter every space above it.

The vessel C, which contains the spirits under treatment, and in which the diaphragms are placed, is preferably made of sheet copper, of sufficient strength to bear a working pressure of thirty pounds per square inch, and may be of any form or size that the amount of business to be done may require. One, for making fifty gallons or less in twenty-four hours, may be cylindrical, of two feet in diameter, by four feet high, with both heads of a hemispherical form, the upper end being provided with a funnel-shaped pipe, D, with stop-cock $d$, for filling the vessel, and with a thermometer, F, and pressure gauge E, and the lower end with a discharging-pipe and cock G.

The vessel thus described containing the spirits, is to be placed in another vessel, B, which may be made of iron, and of a diameter that will leave an annular space of about two inches between the outside of the inner vessel and the inner side of the outer vessel, and a space of about six inches between the bottoms of the two vessels.

The sides of the outer vessel must be about six inches higher than the top of the inner one, so that it will be entirely immersed when the outer one is nearly filled with water.

The outer vessel may have a loose-fitting cover, and an overflow-pipe near its top to allow the vapors of the hot water to escape.

This vessel may be set in a brick or partial iron furnace, A, and be heated by fire direct, or its water may be heated by a coil of steam-pipes in its bottom, and leading to a steam-boiler.

Operation.

The inner and immersed vessel C being charged with spirits through the funnel pipe at its top, heat is applied to the outer vessel, which is full of water; the charging-cock $d$ is left open until as much of the atmospheric air is expelled as will escape at the temperature of 170°, or near the boiling-point of the spirits, when it must be closed. This is an important feature to be noticed, because if the atmospheric air is left in the spirits the heat will incite the saccharine principle to take up its oxygen, and thus form an acid in the liquor instead of fermenting the saccharine principle into alcohol, which is one of the important objects of this invention.

Care must be taken not to fill the vessel C with spirits to its full capacity, but to leave about five per cent. of its capacity for the attenuation of the spirits. The heat must be applied to the outer vessel until its water boils, and the spirit thermometer indicates a temperature of 210° or 212°, and the pressure gauge a pressure of twelve to thirty pounds per square inch, according to the proof of the spirits under treatment, then the heat must be abated by leaving the fire to die out or shutting off the steam, and the whole apparatus allowed to cool down to nearly atmospheric temperature, when the spirits may be withdrawn, and the operation repeated with another charge.

The spirits, after this treatment, will be from one to three degrees higher in proof, and the volume of spirits coming out of the apparatus will be from one to three per cent. larger than when it was put in. This results from the fermentation of the saccharine principle in the spirits, which, increasing the alcohol, attenuates the liquor, raises its hydrometrical proof, and enlarges its volume.

Fusil-oil in a solution of alcohol crystallizes at a temperature of 204°, provided the spirits containing it are not too much agitated by the circulation in heating it up to that degree; hence, the importance of the heat-conducting diaphragms which obviates the necessity of circulating the liquor in order to heat all parts of it, and of their arrangement to prevent mixture, which also impedes circulation, and then when cooled to 60°, has a specific gravity of 95.40, while proof spirits has but 93.35, and lets the fusil-oil fall when cooled to about 90°.

The delicate herbaceous matter in spirits is carbonized by the heat and acids which it absorbs, and altogether precipitates when the liquor is cooled to 90°.

When the spirits are taken out of my apparatus, they will have a dark and feculent appearance, due to the crystallized fusil-oil, and carbonized and acidified herbaceous matter, all of which will precipitate after a few hours of exposure, when the clear liquor should be drawn off.

Distilled liquors of all kinds containing forty per cent. or more of alcohol will be benefited by the use of my invention, but at a lower proof than twenty degrees below, which is forty per cent. alcohol, their specific gravity approaches too near that of the matter to be precipitated, and at a lower proof would probably hold such matter constantly in solution.

I am aware that liquors have heretofore been warmed up to a point less than the boiling-point of alcohol, but this will not answer a purpose effected by my invention, and I make no claim to heating the liquors, unless such heating is carried to a much higher point.

I am also aware that Crossman and Marland, in their patent of December 14, 1869, speak of having heated whisky for a less time than one hour at a temperature of only one degree above its boiling-point, and also at various temperatures from below its boiling-point upward to 265°, maintaining the heat at the degree of temperature to which it was thus raised for various lengths of time from one hour to twenty-four hours.

But there is nothing herein stated which shows that the effects of the particular process hereinbefore described had ever been ascertained by the above-named patentees; and I hereby disclaim all that is by fair intendment presented in the aforesaid description of what they had done in this respect.

Nor do I make any claim to the heating of liquors under pressure, except it be done substantially in the manner hereinbefore described; but What I do claim as new, and desire to secure by Letters Patent, is—

1. Heating distilled or spirituous liquors to the temperature of boiling water, or thereabouts, and then allowing them gradually to cool, all for the purpose, and in the manner above set forth.

2. Cooling distilled or spirituous liquors in a water-bath after having been heated to about the boiling-point of water, all in the manner and for the purpose above set forth.

3. The use of the apparatus above described, consisting of a closed vessel to contain the liquors to be acted upon, surrounded by a water-vessel which is open to the atmosphere, when used for the purpose above described.

4. The use of an arrangement of diaphragms in air-tight vessels, in which distilled liquors are to be heated, in the manner and for the purpose above set forth.

5. Expelling the air from distilled liquors which are about to be heated above their boiling-point, for the purpose and in the manner above described.

SAMUEL H. GILMAN.

Witnesses:
N. B. YARD,
J. L. BRIGGS.